(12) United States Patent
Williams et al.

(10) Patent No.: US 9,780,895 B2
(45) Date of Patent: *Oct. 3, 2017

(54) SMART FM/AM AUTO-SCANNER

(71) Applicant: Panasonic Automotive Systems Company of America, division of Panasonic Corporation of North America, Peachtree City, GA (US)

(72) Inventors: Eric Williams, Atlanta, GA (US); Alan Hightower, Austell, GA (US)

(73) Assignee: Panasonic Automotive Systems Company of America, division of Panasonic Corporation of North America, Peachttree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,685

(22) Filed: Dec. 9, 2016

(65) Prior Publication Data

US 2017/0093511 A1 Mar. 30, 2017

Related U.S. Application Data

(63) Continuation of application No. 15/050,937, filed on Feb. 23, 2016, now Pat. No. 9,548,829, which is a continuation of application No. 14/177,795, filed on Feb. 11, 2014, now Pat. No. 9,306,688.

(51) Int. Cl.
| | | |
|---|---|---|
| *H04H 60/41* | (2008.01) | |
| *H04H 60/47* | (2008.01) | |
| *H04W 36/30* | (2009.01) | |
| *H04W 36/32* | (2009.01) | |
| *H04B 17/00* | (2015.01) | |
| *H04H 60/42* | (2008.01) | |

(52) U.S. Cl.
CPC ............ *H04H 60/42* (2013.01); *H04W 36/30* (2013.01); *H04W 36/32* (2013.01)

(58) Field of Classification Search
CPC ..... H04W 24/00; H04W 40/00; H04W 36/30; H04W 36/32; H04B 1/18; H04B 17/00; H04B 17/20; H04B 17/318; H04H 60/33; H04H 60/41; H04H 60/47
See application file for complete search history.

(56) References Cited

U.S. PATENT DOCUMENTS

| | | | | |
|---|---|---|---|---|
| 5,842,119 A | * | 11/1998 | Emerson | .............. H04B 1/1027 455/154.2 |
| 6,865,379 B1 | * | 3/2005 | Liebenow | .............. H03G 3/341 455/161.1 |

(Continued)

*Primary Examiner* — Blane Jackson
(74) *Attorney, Agent, or Firm* — Laurence S. Roach, Esq.

(57) ABSTRACT

A radio tuning method for a vehicle includes sensing that the vehicle is traveling out of a first broadcast range of a first radio station that a radio of the vehicle is currently tuned to. The first radio station broadcasts first content. A second radio station is identified having a second broadcast range that the vehicle will be in when the vehicle is no longer in the first broadcast range. The identifying includes determining that the second radio station broadcasts second content that is substantially similar to the first content broadcasted by the first radio station. A user of the vehicle is provided with an option to switch tuning of the radio from the first radio station to the second radio station.

20 Claims, 4 Drawing Sheets

(56) References Cited

U.S. PATENT DOCUMENTS

| | | | | |
|---|---|---|---|---|
| 7,636,557 | B2 * | 12/2009 | Klunk | H04H 60/44 |
| | | | | 455/161.2 |
| 9,065,574 | B2 * | 6/2015 | Buch | H04H 20/22 |
| 9,106,350 | B2 * | 8/2015 | Garcia Manchado | G06F 17/30029 |
| 2003/0032399 | A1 * | 2/2003 | Slupe | H03J 1/0058 |
| | | | | 455/161.2 |

* cited by examiner

| Station | GPS location | Range Radius | Genre #1 | Genre #1 weight | Genre #2 | Genre #2 weight |
|---|---|---|---|---|---|---|
| 94.5 | 12.345, -98.765 | 100 miles | Pop | 70% | Rock | 30% |
| 98.3 | 15.45, -80.23 | 75 miles | R&B | 60% | Urban | 40% |

FIG. 3

| Station | FM Signal Strength | Genre #1 | Genre #1 weight | Genre #2 | Genre #2 weight |
|---|---|---|---|---|---|
| 94.5 | 80% | Pop | 70% | Rock | 30% |
| 98.3 | 60% | R&B | 60% | Urban | 40% |

FIG. 4

SMART FM/AM AUTO-SCANNER

CROSS-REFERENCE RELATION APPLICATION

This application is a continuation of U.S. patent application Ser. No. 15/050,937, filed on Feb. 23, 2016, which is currently under allowance, which is a continuation of U.S. patent application Ser. No. 14/177,795, filed on Feb. 11, 2014, which is now U.S. Pat. No. 9,306,688, issued on Apr. 5, 2016, the disclosure of which is hereby incorporated by reference in its entirety for all purposes.

BACKGROUND OF THE INVENTION

1. Field of the Invention

The present invention relates to a method of tuning to a new radio station when a user's vehicle travels out of the broadcast range of a currently-tuned radio station.

2. Description of the Related Art

When a driver of a motor vehicle travels out of the broadcast range of a radio station he is listening to, the driver must initiate a scan of available frequencies by pressing a scan button. Once the driver finds a station that is similar to the station he is currently listening to, he must then again operate the scan button in order to stop the scanning and select the new station as the frequency that the radio should be tuned to. A problem is that the operation of the scan button and selecting a new station diverts the driver's attention from the driving task.

SUMMARY OF THE INVENTION

The invention may provide a smart automotive FM/AM auto-scanner which, as the vehicle moves out of reception range of a currently-tuned radio station, may automatically (e.g., without user intervention) scan frequencies and find an FM/AM station that is most similar to the currently-tuned station. As used herein, stations may be "similar" in that they broadcast the same genre of music or talk. Thus, if the vehicle is traveling out of the broadcast range of a currently-tuned to jazz station, then the radio may automatically find another jazz station that is within reception range of the radio.

In another embodiment, the invention includes automatically displaying a list of receivable stations that are most similar to the currently-tuned station that is moving out of range. The receivable stations may be ordered in the list from most similar to least similar to the currently-tuned station. The user may be enabled to select and listen to each of the receivable stations on the list.

In yet another embodiment, if the station going out of reception range is broadcasting a syndicated program, then the invention includes offering to, or automatically, switching tuning to another station on which the same syndicated program is being broadcast.

The invention comprises, in one form thereof, a radio tuning method for a vehicle, including sensing that the vehicle is traveling out of a first broadcast range of a first radio station that a radio of the vehicle is currently tuned to. The first radio station broadcasts first content. A second radio station is identified having a second broadcast range that the vehicle will be in when the vehicle is no longer in the first broadcast range. The identifying includes determining that the second radio station broadcasts second content that is substantially similar to the first content broadcasted by the first radio station. A user of the vehicle is provided with an option to switch tuning of the radio from the first radio station to the second radio station.

The invention comprises, in another form thereof, a radio tuning method for a vehicle, including sensing that the vehicle is traveling out of a first broadcast range of a first radio station. The first radio station broadcasts first content. A second radio station is identified having a second broadcast range that the vehicle will be in when the vehicle is no longer in the first broadcast range. The second radio station broadcasts second content substantially similar to the first content broadcasted by the first radio station. The identifying includes querying a database of radio stations. The database specifies respective content broadcasted by the radio stations in the database. A user of the vehicle is provided with an option to switch tuning of the radio from the first radio station to the second radio station.

The invention comprises, in yet another form thereof, a radio tuning method for a vehicle, including sensing that the vehicle is traveling out of a first broadcast range of a first radio station. The first radio station broadcasts first content. A second radio station is identified broadcasting second content that is substantially similar to the first content broadcasted by the first radio station. The identifying includes performing a background scan of radio stations that the vehicle is within broadcast range of. A user of the vehicle with an option to switch tuning of the radio from the first radio station to the second radio station.

An advantage of the present invention is that it may reduce driver distraction. The invention may eliminate the need for the driver to direct his attention to the radio to perform a scan when the radio station is no longer within reception range. Also eliminated may be the need for the driver to be attentive to the scanned stations so that the driver knows when to stop the scan.

Another advantage of the present invention is that it may avoid the situation in which the driver performs a scan when a particular radio station is playing a commercial, and then the driver cannot ascertain that the particular station is a desirable station. The present invention may also avoid the situation in which the driver performs a scan and stops the scan at a selected similar station, but the selected station is not the most similar station that is within broadcast range.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 3 illustrates an example database of the invention.

FIG. 4 illustrates another example database of the invention.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
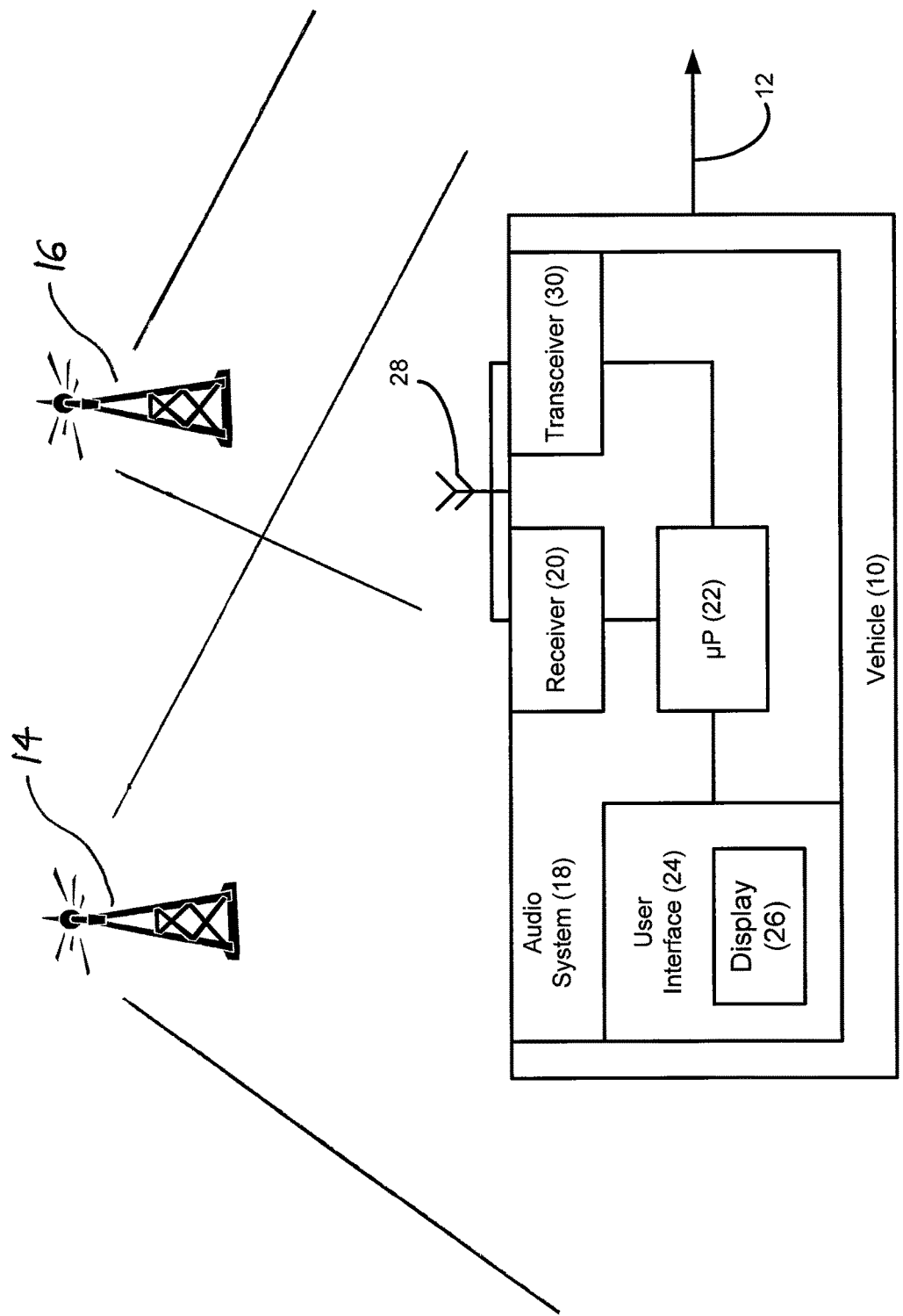
FIG. 1 is a schematic diagram illustrating one embodiment of a smart FM/AM auto-scanning method of the present invention.

Referring now to the drawings, and particularly to FIG. 1, there is shown a vehicle 10 moving in direction 12. As vehicle 10 continues to move in direction 12, vehicle 10 may move farther away from first radio station 14, and thus may move out of the reception range of first radio station 14. Also as vehicle 10 continues to move in direction 12, vehicle 10 may move closer to a second radio station 16, and thus may move into the reception range of second radio station 16. Second radio station 16 may be similar to first radio station 14 in that stations 14 and 16 broadcast the same genre of music or the same genre of talk.

Vehicle 10 may include an audio system 18 having a radio receiver 20 communicatively coupled to a microprocessor 22 which, in turn, is communicatively coupled to a user interface 24. User interface 24 may include a display 26 with a touch screen that a user may use to make selections of options presented on display 26. Receiver 20 may receive radio signals via antenna 28.

As vehicle 10 leaves the broadcast range of first station 14, audio system 18 may sense that the strength of the signal from station 14 is getting lower. In response to sensing the weakening of the signal from station 14, audio system 18 may identify second station 16 as being similar to station 14. Audio system 18 may include a transceiver 30 including a second receiver for background frequency searching and identification of similar stations. After sensing that first station 14 is getting out of range and identifying similar station 16, audio system 18 may present on display 26 a message such as "Your current station is going out of range. I've found a similar station in range . . . Switch?". Audio system 18 may also present on display 26 a first touch button labeled "Yes", and a second touch button labeled "No" with which the user may answer the question about switching. Alternatively, after sensing that first station 14 is getting out of range and identifying the three most similar stations, audio system 18 may present on display 26 a message such as "Your current station is going out of range. Here are the top 3 most similar stations in range". In one embodiment, this message may be an audible message instead of a visible message. Audio system 18 may also present on display 26 a three touch buttons each labeled with the frequency and/or call letters of a respective one of the three most similar stations. Below each of the touch buttons may be displayed the name of the artist and/or song that is currently playing on that station. By touching one of the touch buttons, the user may switch tuning to the respective similar station.

Figure 2:
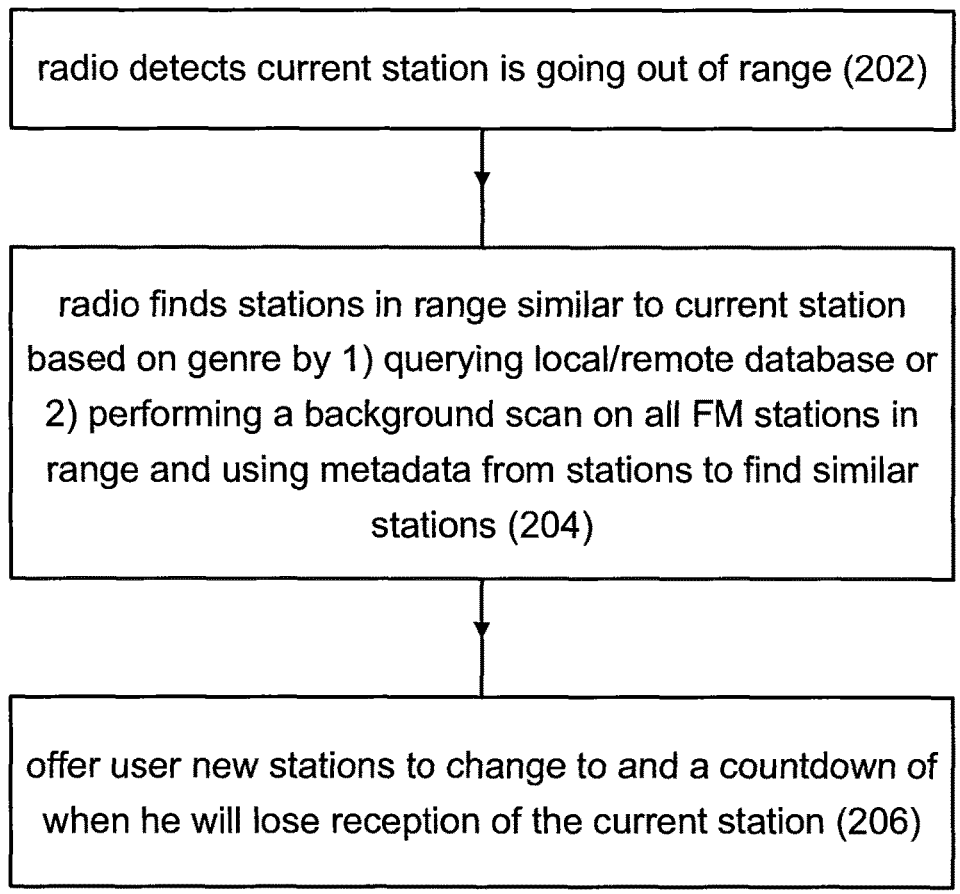
FIG. 2 is a flow chart illustrating another embodiment of a smart FM/AM auto-scanning method of the present invention.

Another embodiment of a smart FM/AM auto-scanning method 200 of the present invention is illustrated in the flow chart of FIG. 2. In a first step 202, a radio detects that a current station is going out of range. For example, audio system 18 may determine that vehicle 10 is moving out of the reception range of first station 14, perhaps by detecting that the signal being received from station 14 is weakening.

In a next step 204, the radio finds stations in range that are similar to the current station in terms of genre by querying a local/remote database, or by performing a background scan on all stations in range and using metadata from all stations in range. For example, audio system 18 may find the three stations that are most similar to the current station by such querying or by performing background scans.

Next, in step 206, the user may be offered new stations to change to, and a countdown to when the user will lose the current station. For example, identifications of the three most similar stations may be presented on display 26, with a selectable respective touch button being presented for each of the stations. Further, a countdown timer may present on display 26 the estimated time in minutes and seconds before the signal from the first station is no longer strong enough to be satisfactorily played on audio system 18.

In order to identify one or more stations that are similar to the current station, audio system 18 may refer to and pull information from a database that is located either locally on the radio or in the cloud. FIG. 3 illustrates an example of such a database of the invention. The weights may indicate what percentage of the station's programming is comprised of each genre of music.

In the event that the database is located in the cloud, the database may be dynamic and easily modified. Regardless, however, of whether the database is locally stored in the radio or in the cloud, audio system 18 may transmit the current GPS location of vehicle 10 and the genre of the currently tuned radio station to the database. If the database is in the cloud, transceiver 30 may be used to transmit this information. In response, the database may transmit to audio system 18 information identifying one or more stations that are in range of vehicle 10 and similar to the currently tuned station. Audio system 18 may then present the station-identifying information on display 26 for selection by the user, as described above.

In another embodiment, audio system 18 requests genre metadata from all stations in reception range. Transceiver 30 may be used for these requests. In response, the stations in reception range may return to audio system 18 the requested genre metadata. Audio system 18 may then take the received metadata and create a database (FIG. 4) of the received metadata. Audio system 18 may then present to the user the most similar stations, taking into account genre matching and the signal strength of the similar stations. The weights may indicate what percentage of the station's programming is comprised of each genre of music.

Figure 5:
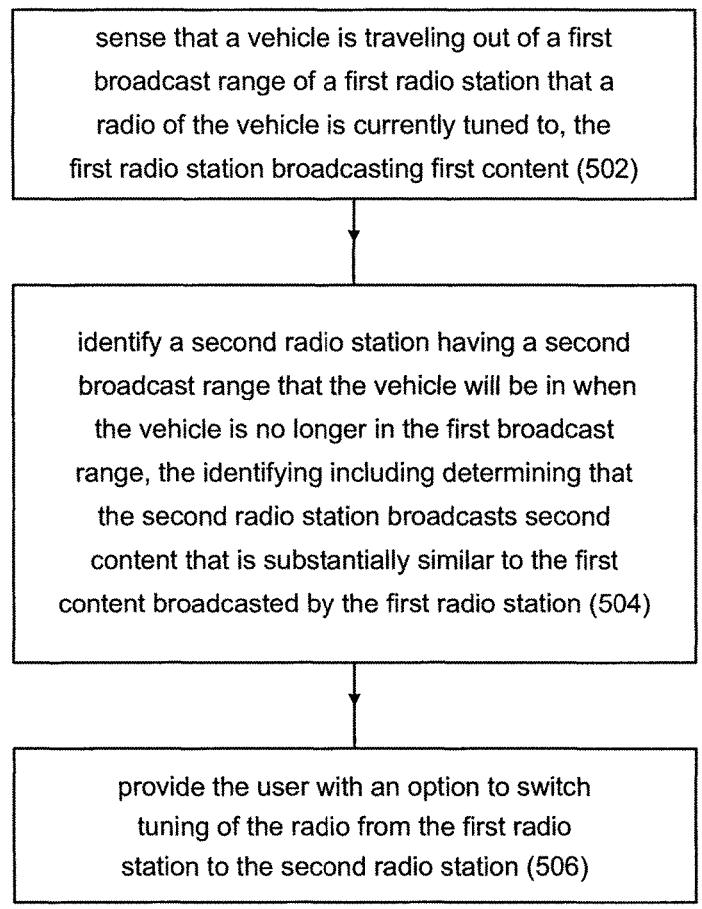
FIG. 5 is a flow chart illustrating yet another embodiment of a smart FM/AM auto-scanning method of the present invention.

Yet another embodiment of a smart FM/AM auto-scanning method 500 of the present invention is illustrated in the flow chart of FIG. 5. In a first step 502, it is sensed that a vehicle is traveling out of a first broadcast range of a first radio station that a radio of the vehicle is currently tuned to. The first radio station broadcasts first content. For example, audio system 18 may determine that vehicle 10 is moving out of the reception range of first station 14, perhaps by detecting that the signal being received from station 14 is weakening. Alternatively, audio system 18 may determine that vehicle 10 is moving out of the reception range of first station 14 by querying a database, such as the database shown in FIG. 3, to ascertain the broadcast range of first station 14. First station 14 may broadcast content of a certain genre of music or talk, or a certain combination of genres in a certain ratio.

In a next step 504, a second radio station is identified having a second broadcast range that the vehicle will be in when the vehicle is no longer in the first broadcast range. The identifying including determining that the second radio station broadcasts second content that is substantially similar to the first content broadcasted by the first radio station. For example, audio system 18 may find, of the stations that will be in broadcast range, a station that is most similar to the current station by querying a local or remote database, such as the database shown in FIG. 3. Alternatively, audio system 18 may perform a background scan to sample stations whose signals can be received. Audio system 18 may then populate a database, such as the database shown in FIG. 4, with data associated with the sampled stations to thereby ascertain which of the sampled stations both can be adequately received and broadcasts content that is most similar to the content of the currently-tuned station.

In a final step 506, the user may be provided with an option to switch tuning of the radio from the first radio station to the second radio station. For example, a question such as "would you like to switch to a similar station?" may be presented on display 26, with a selectable touch button also being presented on display 26 for the user to provide an affirmative response.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A radio tuning method for a vehicle, comprising the steps of:
    tuning the vehicle to a first radio station having a first broadcast range and broadcasting first content;
    identifying a second radio station having a second broadcast range that the vehicle will be in when the vehicle is no longer in the first broadcast range, the identifying including determining that the second radio station broadcasts second content that is substantially similar to the first content broadcasted by the first radio station;
    indicating to a user of the vehicle an estimated period of time remaining until the vehicle exits the first broadcast range of the first radio station; and
    providing the user with an option to switch tuning of the radio from the first radio station to the second radio station.

2. The method of claim 1 wherein the identifying step includes querying a database of radio stations, the database specifying respective content broadcasted by the radio stations in the database.

3. The method of claim 1 wherein the identifying step includes performing a background scan of radio stations that the vehicle is within broadcast range of.

4. The method of claim 3 wherein performing the scan includes adding information to a database specifying respective content broadcasted by the radio stations in the database.

5. The method of claim 3 wherein performing the scan includes adding metadata to a database, the metadata being broadcasted by the scanned radio stations.

6. The method of claim 1 further comprising querying a database of radio stations to thereby estimate when the vehicle will leave the first broadcast range of the first radio station, the database including information indicating the first broadcast range of the first radio station.

7. The method of claim 1 wherein the indicating step includes providing a numerical indication to the user of an estimated period of time remaining until the vehicle exits the first broadcast range of the first radio station.

8. A radio tuning method for a vehicle, comprising the steps of:
    tuning the vehicle to a first radio station having a first broadcast range and broadcasting first content;
    identifying a second radio station having a second broadcast range that the vehicle will be in when the vehicle is no longer in the first broadcast range, the second radio station broadcasting second content substantially similar to the first content broadcasted by the first radio station, the identifying including querying a database of radio stations, the database including a respective broadcast range of each of the radio stations in the database;
    providing a user of the vehicle with an estimated period of time remaining until the vehicle exits the first broadcast range of the first radio station; and
    providing a user of the vehicle with an option to switch tuning of the radio from the first radio station to the second radio station.

9. The method of claim 8 wherein the database specifies respective content broadcasted by the radio stations in the database.

10. The method of claim 8 wherein the providing step includes presenting to the user a numerical indication of an estimated period of time remaining until the vehicle exits the first broadcast range of the first radio station.

11. The method of claim 8 further comprising estimating when the vehicle will leave the first broadcast range of the first radio station, the estimating including querying the database of radio stations, the database including information indicating a broadcast range of the first radio station.

12. The method of claim 8 wherein the database includes geographic coordinates of the radio stations in the database.

13. The method of claim 8 wherein the radio of the vehicle is tuned to the first radio station during at least the identifying step.

14. The method of claim 8 wherein the database includes information indicating whether each of the respective radio stations in the database has a broadcast range that the vehicle will be in when the vehicle is no longer in the first broadcast range.

15. A radio tuning method for a vehicle, comprising the steps of:
    tuning the vehicle to a first radio station having a first broadcast range and broadcasting first content;
    identifying a second radio station broadcasting second content that is substantially similar to the first content broadcasted by the first radio station, the identifying including performing a background scan of radio stations that the vehicle is within broadcast range of;
    indicating to a user of the vehicle an estimated period of time remaining until the vehicle exits the first broadcast range of the first radio station: and
    providing the user with an option to switch tuning of the radio from the first radio station to the second radio station.

16. The method of claim 15 wherein the performing of the background scan includes adding information to a database specifying respective content broadcasted by the radio stations in the database.

17. The method of claim 15 wherein the performing of the background scan includes adding metadata to a database, the metadata being broadcasted by the scanned radio stations.

18. The method of claim 15 further comprising estimating when the vehicle will leave the first broadcast range of the first radio station, the estimating including querying a database of radio stations, the database including information indicating the first broadcast range of the first radio station.

19. The method of claim 15 wherein the identifying step includes querying a database of radio stations, the database specifying respective content broadcasted by the radio stations in the database.

20. The method of claim 15 wherein the indicating step includes providing a numerical indication to the user of an estimated period of time remaining until the vehicle exits the first broadcast range of the first radio station.

\* \* \* \* \*